United States Patent
Ough et al.

(10) Patent No.: US 12,500,423 B2
(45) Date of Patent: *Dec. 16, 2025

(54) MOBILE HYBRID MICROGRID

(71) Applicant: VOLTAGRID LLC, Bellaire, TX (US)

(72) Inventors: Nathan Ough, Bellaire, TX (US);
Leslie Michael Wise, Houston, TX (US)

(73) Assignee: VOLTAGRID LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,194

(22) Filed: Jan. 13, 2022

(65) Prior Publication Data
US 2022/0140614 A1    May 5, 2022

Related U.S. Application Data

(63) Continuation-in-part of application No. 17/385,579, filed on Jul. 26, 2021, now abandoned, and a
(Continued)

(51) Int. Cl.
*H02J 3/38*    (2006.01)
*H02J 3/32*    (2006.01)
(Continued)

(52) U.S. Cl.
CPC ............. *H02J 3/381* (2013.01); *H02J 3/32* (2013.01); *H02J 3/46* (2013.01); *H02B 1/52* (2013.01); *H02J 2300/10* (2020.01)

(58) Field of Classification Search
CPC . H02J 3/28–32; H02J 3/38–50; H02J 2300/10
See application file for complete search history.

(56) References Cited

U.S. PATENT DOCUMENTS 3,773,152 A    11/1973    Sitton
4,894,764 A    1/1990    Meyer et al.
(Continued)

FOREIGN PATENT DOCUMENTS

AU    2022263514    6/2023
CA    3078879    4/2019
(Continued)

OTHER PUBLICATIONS

US 10,774,631 B2, 09/2020, Oehring et al. (withdrawn)
(Continued)

*Primary Examiner* — Rexford N Barnie
*Assistant Examiner* — David A Shiao
(74) *Attorney, Agent, or Firm* — Morgan, Lewis & Bockius LLP

(57) ABSTRACT

A microgrid system includes a plurality of power sources and a switchgear trailer. Each power source includes an electrical output. The switchgear trailer includes a plurality of inputs and at least one output. Each input is electrically connected to a respective power source electrical output. The system may also comprise a controller configured to obtain one or more parameters of the plurality of power sources and control operation of at least one of the plurality of power sources or the switchgear trailer in response to the one or more parameters.

23 Claims, 11 Drawing Sheets

Related U.S. Application Data continuation-in-part of application No. 17/385,441, filed on Jul. 26, 2021, now Pat. No. 12,261,417.

(60) Provisional application No. 63/056,362, filed on Jul. 24, 2020, provisional application No. 63/056,370, filed on Jul. 24, 2020.

(51) Int. Cl.
    *H02J 3/46*     (2006.01)
    *H02B 1/52*     (2006.01)

(56) References Cited

U.S. PATENT DOCUMENTS

| | | |
|---|---|---|
| 5,315,831 A | 5/1994 | Goode et al. |
| 7,795,752 B2 | 9/2010 | Gorman et al. |
| 8,013,470 B2 | 9/2011 | Votoupal et al. |
| 8,062,169 B2 | 11/2011 | Marr et al. |
| 8,258,640 B2 | 9/2012 | Conway et al. |
| 8,360,180 B2 | 1/2013 | Hoff et al. |
| 8,587,136 B2 | 11/2013 | Williams |
| 8,975,767 B2 | 3/2015 | Algrain |
| 9,103,193 B2 | 8/2015 | Coli |
| 9,140,110 B2 | 9/2015 | Coli et al. |
| 9,175,614 B2 | 11/2015 | Hoefer et al. |
| 9,562,420 B2 | 2/2017 | Morris et al. |
| 9,660,455 B2 | 5/2017 | Votoupal et al. |
| 9,722,445 B2 | 8/2017 | Yu et al. |
| 9,893,500 B2 | 2/2018 | Oehring et al. |
| 9,970,278 B2 | 5/2018 | Broussard et al. |
| 9,995,218 B2 | 6/2018 | Oehring et al. |
| 10,020,711 B2 | 7/2018 | Oehring |
| 10,146,242 B2 | 12/2018 | Steffen et al. |
| 10,240,322 B2 | 3/2019 | Miller et al. |
| 10,280,724 B2 | 5/2019 | Hinderliter |
| 10,374,485 B2 | 8/2019 | Morris et al. |
| 10,389,121 B1 | 8/2019 | Sherry |
| 10,519,730 B2 | 12/2019 | Morris et al. |
| 10,526,882 B2 | 1/2020 | Oehring et al. |
| 10,598,258 B2 | 3/2020 | Oehring et al. |
| 10,686,301 B2 | 6/2020 | Oehring et al. |
| 10,837,270 B2 | 11/2020 | Coli et al. |
| 10,851,638 B2 | 12/2020 | Payne et al. |
| 10,927,802 B2 | 2/2021 | Oehring et al. |
| 10,962,305 B2 | 3/2021 | Morris et al. |
| 10,998,732 B2 | 5/2021 | Reddy et al. |
| 11,035,207 B2 | 6/2021 | Oehring et al. |
| 11,070,109 B2 | 7/2021 | Morris et al. |
| 11,181,107 B2 | 11/2021 | Oehring et al. |
| 11,211,801 B2 | 12/2021 | Hinderliter et al. |
| 11,391,269 B2 | 7/2022 | Tanner |
| 11,434,763 B2 | 9/2022 | Morris et al. |
| 11,451,085 B2 | 9/2022 | Reddy et al. |
| 11,476,781 B2 | 10/2022 | Oehring et al. |
| 11,578,577 B2 | 2/2023 | Hinderliter et al. |
| 11,578,580 B2 | 2/2023 | Oehring et al. |
| 11,946,353 B2 | 4/2024 | Bosco et al. |
| 2004/0265198 A1 | 12/2004 | Biswas et al. |
| 2007/0273211 A1* | 11/2007 | Wang ............... H02J 3/38 307/45 |
| 2010/0283244 A1 | 11/2010 | Towson et al. |
| 2012/0182670 A1 | 7/2012 | Prax et al. |
| 2012/0292992 A1* | 11/2012 | Williams ............. H02J 9/06 307/77 |
| 2013/0002027 A1 | 1/2013 | Yu et al. |
| 2014/0062199 A1* | 3/2014 | Martinez ............. H02J 3/38 307/53 |
| 2015/0180393 A1* | 6/2015 | Tesch ............... H02P 9/007 322/29 |
| 2016/0282892 A1* | 9/2016 | Saavedra ............. G06F 1/263 |
| 2016/0348479 A1 | 12/2016 | Oehring et al. |
| 2017/0145918 A1 | 5/2017 | Oehring et al. |
| 2017/0201077 A1 | 7/2017 | Hafner et al. |
| 2017/0222409 A1* | 8/2017 | Oehring ............... H02B 7/06 |
| 2017/0237274 A1 | 8/2017 | Pavel et al. |
| 2018/0123357 A1 | 5/2018 | Beaston et al. |
| 2019/0027937 A1* | 1/2019 | Harknett ............ H04L 12/40 |
| 2019/0106970 A1 | 4/2019 | Oehring |
| 2019/0323428 A1 | 10/2019 | Oehring et al. |
| 2020/0040272 A1* | 2/2020 | Cavness ............... F02C 3/22 |
| 2020/0040705 A1 | 2/2020 | Morris et al. |
| 2020/0087997 A1 | 3/2020 | Morris et al. |
| 2020/0095854 A1 | 3/2020 | Hinderliter |
| 2020/0243813 A1 | 7/2020 | Zhang et al. |
| 2020/0251910 A1 | 8/2020 | Moorman |
| 2020/0263526 A1* | 8/2020 | Fischer ............... H02K 7/18 |
| 2020/0300073 A1 | 9/2020 | Hinderliter et al. |
| 2020/0301383 A1* | 9/2020 | Reddy ............... H02J 3/381 |
| 2020/0340340 A1 | 10/2020 | Oehring et al. |
| 2020/0355058 A1 | 11/2020 | Payne et al. |
| 2020/0355120 A1 | 11/2020 | Oehring et al. |
| 2020/0386169 A1 | 12/2020 | Hinderliter et al. |
| 2021/0025382 A1 | 1/2021 | Harvell et al. |
| 2021/0032961 A1 | 2/2021 | Hinderliter et al. |
| 2021/0062596 A1* | 3/2021 | Fischer ............... H02B 1/52 |
| 2021/0075222 A1 | 3/2021 | Wilson et al. |
| 2021/0095552 A1 | 4/2021 | Oehring et al. |
| 2021/0102531 A1 | 4/2021 | Bodishbaugh et al. |
| 2021/0131248 A1 | 5/2021 | Hinderliter et al. |
| 2021/0159677 A1 | 5/2021 | Oehring et al. |
| 2021/0230987 A1 | 7/2021 | Tanner |
| 2021/0245607 A1 | 8/2021 | Zhang et al. |
| 2021/0262321 A1 | 8/2021 | Oehring et al. |
| 2021/0310341 A1 | 10/2021 | Sherman et al. |
| 2021/0351660 A1 | 11/2021 | Morris et al. |
| 2021/0351661 A1 | 11/2021 | Morris et al. |
| 2021/0359521 A1 | 11/2021 | Gayles et al. |
| 2022/0010758 A1 | 1/2022 | Oehring et al. |
| 2022/0018232 A1 | 1/2022 | Oehring et al. |
| 2022/0041153 A1 | 2/2022 | Sakaray et al. |
| 2022/0045376 A1 | 2/2022 | Sakaray et al. |
| 2022/0045380 A1 | 2/2022 | Sakaray et al. |
| 2022/0069613 A1 | 3/2022 | Reddy et al. |
| 2022/0094173 A1 | 3/2022 | Hinderliter et al. |
| 2022/0131381 A1 | 4/2022 | Sergott et al. |
| 2022/0131388 A1 | 4/2022 | Sergott et al. |
| 2022/0200291 A1 | 6/2022 | Guo et al. |
| 2022/0239100 A1 | 7/2022 | Hinderliter et al. |
| 2022/0333594 A1 | 10/2022 | Oehring et al. |
| 2022/0364448 A1 | 11/2022 | Oehring et al. |
| 2022/0385074 A1 | 12/2022 | Hinderliter |
| 2023/0109325 A1 | 4/2023 | Oehring et al. |
| 2023/0187964 A1* | 6/2023 | Cohn ............... F02B 63/044 307/64 |
| 2023/0258063 A1 | 8/2023 | Oehring et al. |
| 2023/0272699 A1 | 8/2023 | Oehring et al. |
| 2023/0272700 A1 | 8/2023 | Hinderliter et al. |
| 2023/0383635 A1 | 11/2023 | Bosco et al. |

FOREIGN PATENT DOCUMENTS

| | | |
|---|---|---|
| CA | 2964593 | 11/2021 |
| CA | 3157053 | 5/2022 |
| CA | 3067854 | 6/2022 |
| CA | 2908276 | 11/2022 |
| CN | 16075963 | 5/2023 |
| CN | 116056930 | 5/2023 |
| CN | 116058085 | 5/2023 |
| CN | 116073454 | 5/2023 |
| EP | 2192664 | 5/2013 |
| EP | 3830387 | 2/2020 |
| GB | 2506015 | 3/2014 |
| WO | 2022182886 | 9/2022 |

OTHER PUBLICATIONS

Martin Anderson, "Turbines vs. Reciprocating Engine Generators", May 13, 2020 (Year: 2020).*

Ralf Grosshauser, Kevin Clark, "Turbines vs. Reciprocating Engines", Nov. 17, 2016 (Year: 2016).*

(56) References Cited

OTHER PUBLICATIONS

Dynamis Products, May 15, 2021. (Year: 2021).*

* cited by examiner

MOBILE HYBRID MICROGRID

REFERENCE TO RELATED APPLICATIONS

This application is a continuation-in-part of U.S. patent application Ser. No. 17/385,441, filed on Jul. 26, 2021, which claims priority to U.S. Provisional Patent Application 63/056,362, filed Jul. 24, 2020. This application is also a continuation-in-part of U.S. patent application Ser. No. 17/385,579, filed on Jul. 26, 2021, which claims priority to U.S. Provisional Application No. 63/056,370, filed Jul. 24, 2020, the entire disclosure of each of these applications being incorporated herein by this reference.

TECHNICAL FIELD

The present disclosure relates generally to microgrids, and more particularly, to microgrids and methods of operation thereof.

BACKGROUND

A microgrid is a self-sufficient energy system that serves a discrete geographic footprint. The microgrid is made up of a decentralized group of electricity sources and loads that normally operate connected to, and synchronous with, the traditional wide area synchronous grid (macrogrid). These electricity sources can also disconnect to "island mode," where the microgrid operates independently of the macrogrid, and function autonomously as physical or economic conditions dictate. In this way, a microgrid can effectively integrate various sources of distributed generation (DG), especially renewable energy sources (RES), and can supply emergency power, changing between island and connected modes. Microgrids are also capable of dispatching power to the macrogrid.

Microgrids are often utilized as localized energy sources, where power transmission and distribution from a major centralized energy source is impractical to implement and/or cost prohibitive.

However, microgrids often have a large geographical footprint with components that are difficult or costly to move. Accordingly, certain microgrids may be impractical for short term operations, such as oil and gas operations.

Further, microgrids typically use generators for power. Many existing microgrids use natural gas turbine generators. Turbine generators suffer from numerous drawbacks, particularly for certain applications such as oil and gas operations. For example, turbine generators are often unreliable, especially so in an environment such as the oilfield, where the turbines are exposed to harsh environmental conditions. Turbine generators also generally operate best when they are at or near full load. Oil and gas operations, such as hydraulic fracturing, often fluctuate considerably in the amount of power that is required. Furthermore, natural gas turbine generators, including those used for oil and gas operations, are often relatively large, on the order of 25 MW. For both reasons, turbine generators used in such applications generally waste a considerable amount of natural gas because they are operated at or near full load (e.g., 25 MW) even when the amount of power actually required by the operator is much lower.

The size of typical turbine generators can also present problems in an application that might require excess power capacity as a safety factor. For example, consider a 25 MW turbine generator being used in connection with an electric hydraulic fracturing operation that typically requires up to 25 MW of power. Many operators in that situation would require a second generator to be available, in the event that the total peak power required by the system temporarily exceeds 25 MW. The commitment of two very large turbine generators for a single job makes the use of this type of generator even more inefficient.

Some of the drawbacks of turbine generators can be addressed through the use of reciprocating generators, however certain reciprocating generators utilize fuels, such as diesel fuel, which can result in unwanted carbon emissions. Further, certain generators may not be able to increase power output at the rate that load is applied. Accordingly, certain microgrids that utilize reciprocating generators may experience voltage sag or swell during transient loads, which may reduce the quality of power provided by the microgrid. In applications such as oil & gas production, it is critically important that power be adjusted almost instantly as dictated by operating and downhole conditions.

An important feature of a microgrid, or any electrical transmission system, is the switchgear used to connect the generator(s) to the equipment receiving the power. Because turbine generators are so large, the associated switchgear is also correspondingly large. For example, U.S. Pat. No. 9,893,500 ("Oehring") describes a power generation and distribution system utilizing natural gas turbine generators like those described above. Oehring teaches (for example, at column 5, lines 40-48) that, because each generator is associated with its own switchgear trailer, multiple such trailers are required in order to combine the output of more than one generator. The requirement for multiple large generators and multiple separate switchgear trailers increases the overall complexity and cost of generating power for an application such as hydraulic fracturing.

Therefore, what is needed is an apparatus, system or method that addresses one or more of the foregoing issues, among one or more other issues.

SUMMARY

In one embodiment, a mobile microgrid may comprise a plurality of energy sources and a switchgear trailer. The plurality of energy sources may comprise one or more reciprocating natural gas generators and/or one or more electrical storage systems. The switchgear trailer may comprise an output, a plurality of inputs equal to or greater than the number of energy sources, a plurality of circuit breakers connected to the energy sources, and a bus bar.

In one embodiment, the mobile microgrid may also comprise a controller configured to obtain one or more parameters of the plurality of energy sources and control operation of the switchgear trailer and/or the energy sources in response to the one of more parameters In one embodiment, each input of the switchgear trailer may define a maximum input amperage. The at least one output defines a maximum output amperage. The maximum output amperage is greater than the maximum input amperage of each input. The bus bar is electrically connected to each of the plurality of inputs and the at least one output. A maximum bus bar amperage is greater than or equal to the maximum output amperage.

In one embodiment, the mobile microgrid may comprise an electrical storage system comprising a battery, an inverter, and an output electrically connected to the switchgear trailer.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
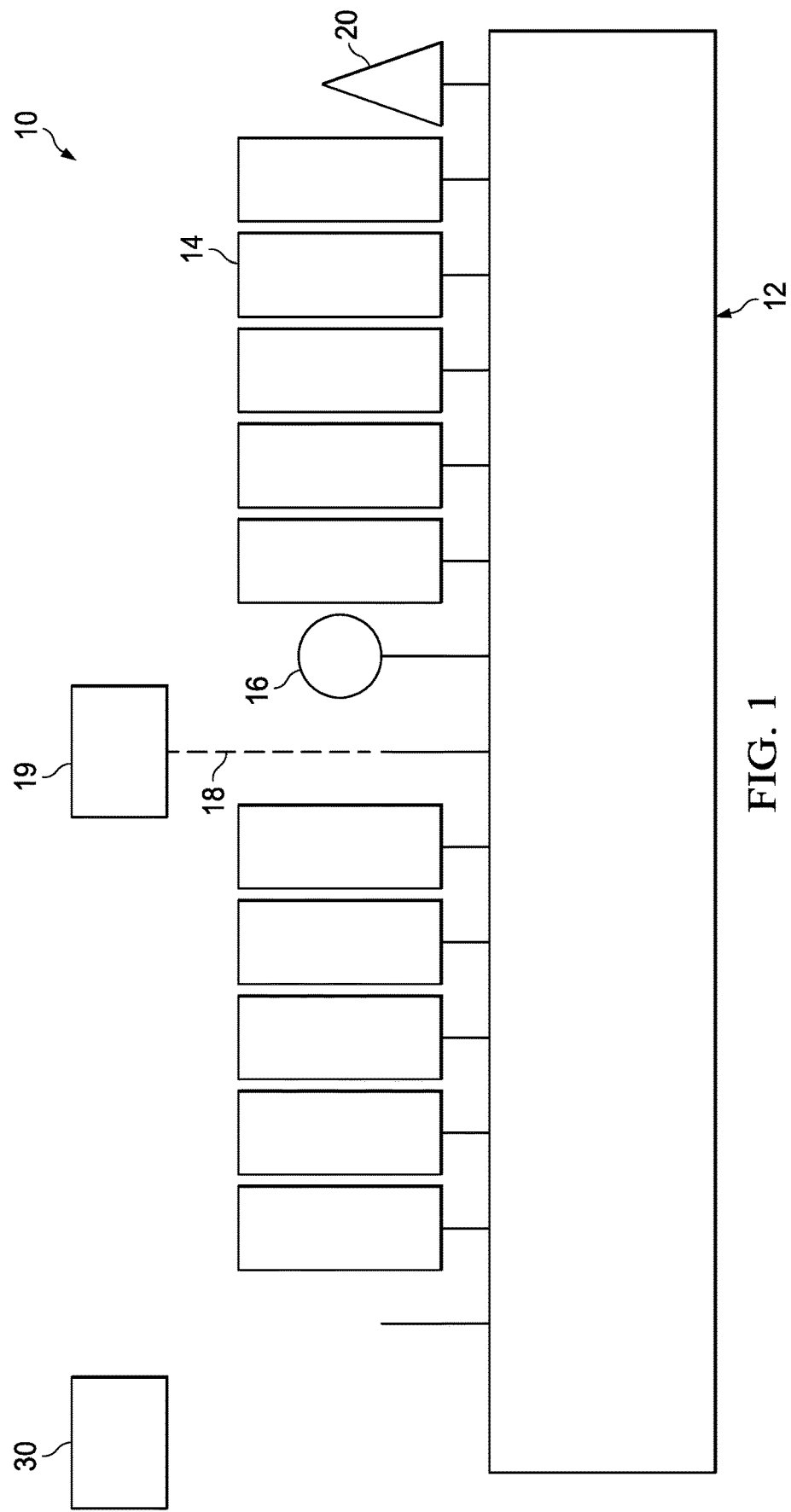
FIG. 1 is a schematic top view of a mobile hybrid microgrid system, in accordance with embodiments of the present disclosure.

The present disclosure relates generally to microgrids, and more particularly, to microgrids and methods of operation thereof. As described herein, embodiments of the microgrid, switchgear trailer, controller, and methods of use thereof described herein address the issues described with respect to traditional microgrid configurations.

A microgrid is a self-sufficient energy system that serves a discrete geographic footprint. The microgrid is made up of a decentralized group of electricity sources and loads that normally operate connected to, and synchronous with, the traditional wide area synchronous grid (macrogrid). These electricity sources can also disconnect to "island mode," where the microgrid operates independently of the macrogrid, and function autonomously as physical or economic conditions dictate. In this way, a microgrid can effectively various sources of distributed generation (DG), especially renewable energy sources (RES), and can supply emergency power, changing between island and connected modes. Microgrids are also capable of dispatching power to the macrogrid.

Microgrids are often utilized as localized energy sources, where power transmission and distribution from a major centralized energy source is impractical to implement and/or cost prohibitive.

However, microgrids often have a large geographical footprint with components that are difficult or costly to move. Accordingly, certain microgrids may be impractical for short term operations, such as oil and gas operations.

Further, microgrids often use generators for power. Certain generators utilize certain fuels which can result in unwanted carbon emissions. Further, certain generators may not be able to increase power output at the rate that load is applied. Accordingly, certain microgrids that utilizes generators may experience voltage sag or swell during transient loads, which may reduce the quality of power provided by the microgrid.

In some applications, certain microgrids may be unreliable, especially when reduced to a size for mobile applications. In the event a power source is offline, it can be costly and time-consuming to replace and operate a power source. For example, in oil and gas operations, since delays can cost an operator hundreds of thousands or even millions of dollars, reliability of the microgrid is critical.

As described herein, embodiments of the microgrid can include a switchgear trailer with an "oversized" bus bar to ensure flexibility with high power loads. Additional embodiments can include a microgrid with a plurality of reciprocating generators, which allows for space-efficient and rapidly deployable power generation. Further embodiments of the microgrid utilize an electrical storage system to ensure that loads are met while one or more generators are in a transient state. Certain embodiments can utilize a controller to control the operation of the microgrid as well as allow for real-time monitoring and analysis.

Such arrangements allow for reliable and flexible power from the microgrid with the additional benefit of manipulating the energy utilized as the situation requires. Further, the present technology enables mobile hybrid microgrids to be rapidly deployed and rapidly moved compared to conventional switchgears, which are typically built as a building or on a skid, intended to be permanently installed. The technology described herein can be used in many different applications, including, for example mining, utility power, oilfield applications, industrial application, and any application that requires a microgrid, especially a temporary, mobile microgrid.

FIG. 1 is a schematic top view of a mobile hybrid microgrid system 10, in accordance with embodiments of the present disclosure. As illustrated, the mobile hybrid microgrid system 10 can provide electricity to one or more devices or loads 19. In the depicted example, the microgrid system 10 can receive power from one or more power sources, combine power from the power sources, and output or distribute the power to one or more loads 19. Advantageously, the microgrid system 10 can provide electricity to loads 19 that may be geographically or otherwise isolated from a macrogrid, or in other applications where power from the macrogrid is not feasible or desirable. Further, the microgrid system 10 can provide electricity to loads 19 that may require more power than a single power source can provide.

In the depicted example, the microgrid system 10 includes a switchgear trailer 12 that receives power from one or more power source and outputs or distributes the power to one or more loads 19. In the illustrated embodiment, switchgear trailer 12 can receive power from one or more generators 14 and/or one or more electrical storage systems 20.

As described herein, the microgrid system 10 can utilize utility or macrogrid power via a utility section 16 to provide power to the switchgear trailer 12. In some applications, macrogrid power can be utilized to supplement power provided by the generators 14 and/or the electrical storage systems 20. Further, a microgrid system 10 may strategically utilize power from the macrogrid in events or applications where macrogrid power is cost-effective compared to other power sources. Optionally, the microgrid system 10 may sell power generated by the generators 14 and/or the electrical storage systems 20 back to the macrogrid via the utility section 16. In some embodiments, the switchgear trailer 12 includes one or more devices to synchronize the frequency of the power generated by the generators 14 and/or the electrical storage systems 20 with the frequency of the power provided by the macrogrid.

In some embodiments, the switchgear trailer 12 can receive power from a single power source, such as a single generator 14, utility or macrogrid power via the utility section 16, or stored power via a single electrical storage system 20. Alternatively, the switchgear trailer 12 can receive power from a combination of multiple power sources, such as multiple generators 14, utility or macrogrid power via the utility section 16, and/or stored power via multiple electrical storage systems 20. In some embodiments, the switchgear trailer 12 can receive power from any other suitable power source, such as a wind turbine, solar panels, etc.

In certain embodiments, power sources, such as the generators 14 can be interchangeable. For example, in the event of a generator 14 or other power source failure, the generator 14 or other power source can be taken offline and replaced with a replacement generator 14 or other power source. Optionally, the power sources, such as the generators 14 and/or the electrical storage systems 20 can be transported and/or stored on trailers, facilitating the movement and replacement of power sources as needed. Further, additional generators 14 or other power sources can be added as load 19 demands increase.

As described herein, the switchgear trailer 12 can combine the power received by the one or more generators 14, a utility section 16, and/or one or more electrical storage system 20 and can distribute the power to one or more loads 19 via a feeder section or output 18. In some embodiments, the switchgear trailer 12 can include multiple outputs 18 suitable for various loads. Advantageously, the power distributed to the one or more loads 19 can be greater than the power provided by any single power source (e.g., generator 14, utility section 16, and/or electrical storage system 20). Optionally, a control system 30 can monitor and adjust operation parameters of the microgrid system 10 and components thereof.

Figure 2:
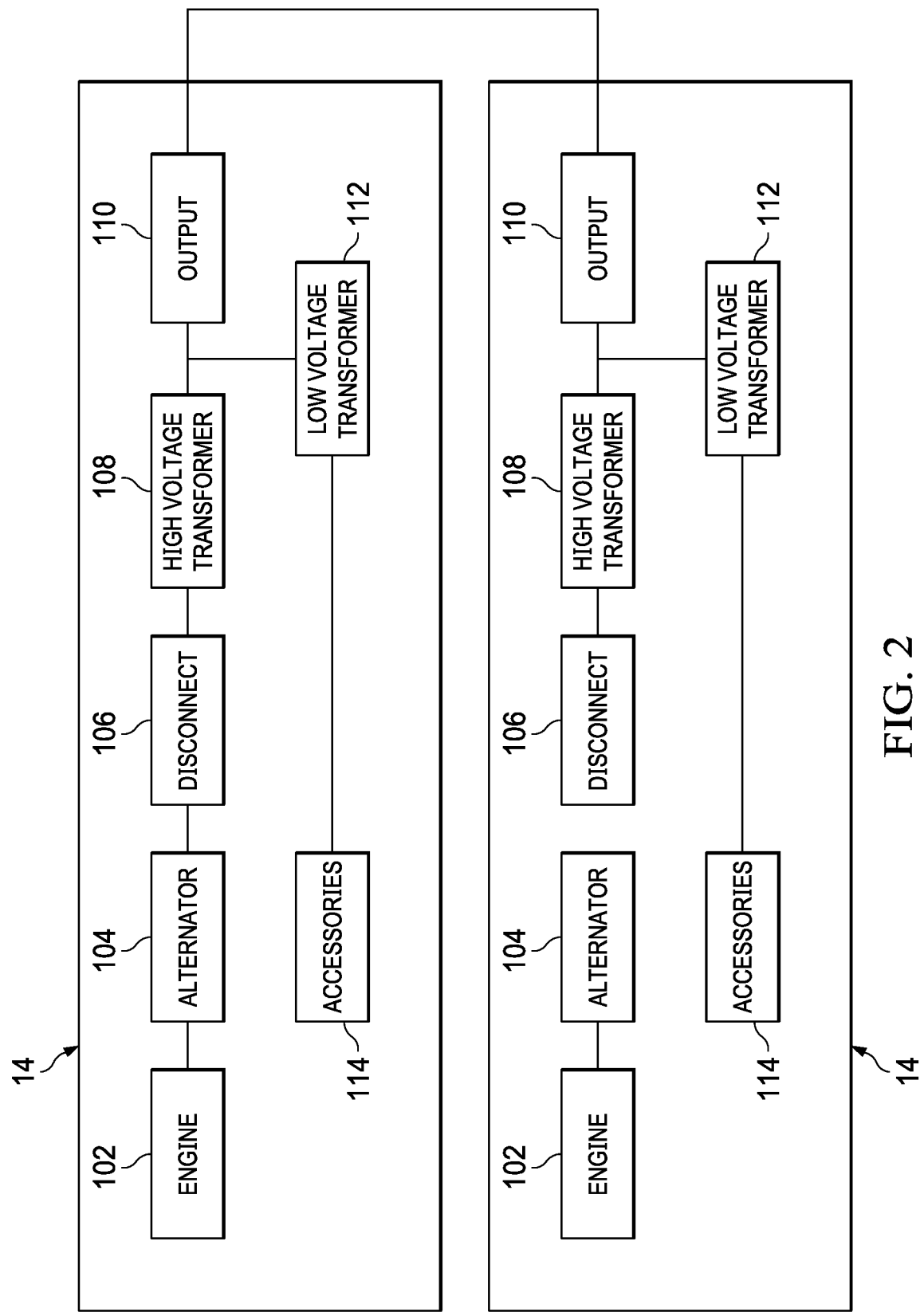
FIG. 2 is a schematic view of a generator, in accordance with embodiments of the present disclosure.

FIG. 2 is a schematic view of a generator 14, in accordance with embodiments of the present disclosure. With reference to FIGS. 1 and 2, the microgrid system 10 can utilize one or more generators 14 to provide power to the switchgear trailer 12.

In the depicted example, the generators 14 can utilize an engine 102 to operate an alternator 104 to generate power. In some embodiments, the engine 102 can be a reciprocating engine (e.g., the G3520 engine manufactured by Caterpillar). Advantageously, a generator 14 that utilizes a reciprocating engine 102 can be more compact and cost-effective compared to other engine arrangements. Further, start-up procedures for reciprocating engines 102 may be simplified and faster compared to start-up procedures for other engine types. For example, a reciprocating engine 102 may utilize a conventional starter and battery for initial startup, while other engines, such as a turbine engine may require a secondary blackstart generator to provide sufficient energy for initial startup. Further, the engine 102 may utilize fast start technology to allow the engine 102 to rapidly startup and generate power in response to increased demand or load on the generator 14. However, in other embodiments, the engine 102 can be a turbine or other type of engine.

Further, in the depicted example, the engine 102 can be fueled by natural gas. Advantageously, natural gas operation may allow for lower emissions, lower cost of operation, and may be readily available in certain locations where microgrid systems 10 are deployed, such as oil and gas wellsites. Optionally, engines 102 can be fueled by hydrogen, diesel, and/or other combustible gasses.

The use of reciprocating natural gas engines provides numerous advantages over existing mobile power generation systems. For example, such engines tend to be considerably smaller than turbine generators. While turbines often provide 25 MW of power, reciprocating natural gas engines may provide 2.5-3.5 MW of power. This smaller size allows for more efficiency in the overall system because some of the generators may be shut down when not needed. In other words, if the equipment being powered only requires 15 MW, it could be provided by six 2.5-MW reciprocating natural gas generators, rather than a 25-MW turbine, which must generally be operated near full capacity.

In addition, the use of a plurality of reciprocating natural gas engines increases the modularity and reliability of the overall system. If a 25-MW turbine generator experiences an issue that requires it to be shut down for maintenance or repair, the entire operation may be affected. In an application such as hydraulic fracturing, a delay of even a few hours can cost the operator of the well hundreds of thousands of dollars. However, if power is provided by ten 2.5-MW reciprocating natural gas generators, a problem with one generator generally will not shut down the entire operation. The single problematic generator may simply be replaced or, if no replacement is readily available, power may temporarily be provided by an electrical storage system (such as that discussed below) while the generator is being repaired.

In the depicted example, the engine 102 rotates or otherwise energizes an alternator 104 to generate electricity. In some embodiments, the alternator 104 outputs electricity at a voltage that is suitable for distribution via output 110. In the depicted example, the voltage of the alternator 104 output is increased via a high voltage transformer 108. For example, the high voltage transformer 108 can provide electricity at 13.8 kV or any other voltage suitable for the load through the output 110 of the generator 14.

In some embodiments, the generator 14 can utilize generated electricity to power accessories 114 related to the generator 14 and the engine 102. Accessories 114 may include, but are not limited to a coolant pump, an oil pump, and/or an oil heater. The generator 14 can include a low voltage transformer 112 to provide electricity at 480V or any other voltage suitable for accessory 114 loads. The low voltage transformer 112 can receive electricity from the high voltage transformer 108 or the alternator 104 directly.

As illustrated in FIGS. 1 and 2, the microgrid system 10 can include multiple generators 14 to provide power to the switchgear trailer 12. In some embodiments, generators 14 can be brought online or taken offline as demand or load 19 changes. During operation, generators 14 can be started using conventional starting procedures.

In some embodiments, electricity generated by an online generator 14 can be used to power the accessories 114 of an offline generator 14. Advantageously, by powering the accessories 114 of an offline generator 14 with an online generator 14, the offline generator 14 can be readily brought online as demand increases across the microgrid system 10. For example, by powering the accessories 114 of an offline generator 14, the coolant can be pre-circulated and the oil can be pre-warmed and pre-circulated to allow for rapid start up. Further, by powering the accessories 114 of an offline generator 14, the offline generator 14 can be started using power from the online generator 14.

In the depicted example, power from the output 110 of the online generator 14 can be backfed to the offline generator 14 through the output 110 of the offline generator 14. During a backfeeding operation, the high voltage transformer 108 of the offline generator 14 can be disconnected from the alternator 104 via a disconnect 106, isolating the offline alternator 104 from the output 110 of the offline generator 14. Accordingly, backfed power from the online generator 14 can be provided to the accessories 114 of the offline generator 14 through the output 110 of the offline generator 14. As illustrated, the voltage of the backfed power can be adjusted through the low voltage transformer 112 to power the accessories 114 of the offline generator 14. Optionally, the backfed power can also provide high voltage power through the high voltage transformer 108 of the offline generator 14. After the offline generator 14 is brought online, the backfeed of power through the output 110 can be stopped and the alternator 104 can be reconnected to the high voltage transformer 108.

In some embodiments, the microgrid system 10 can include a sufficient number of generators 14 to allow the power produced by the generators 14 to exceed the maximum anticipated load 19 by the microgrid system 10. Further, in some embodiments, the microgrid system 10 can include a sufficient number of generators 14 to allow the power produced by a subset of generators 14 to exceed the maximum anticipated load 19 by the microgrid system 10, allowing for at least one redundant generator 14. For example, a microgrid system 10 can include ten generators 14 in a configuration wherein nine generators 14 produce sufficient power to exceed the maximum anticipated load 19 by the microgrid system 10, allowing for at least one redundant generator 14. In some embodiments, the microgrid system 10 can include more than one redundant generator 14.

As noted above, by utilizing redundant generators 14, the microgrid system 10 can be operated with more flexibility and efficiency. For example, by utilizing redundant generators 14, one or more generators 14 can be taken offline for maintenance without affecting the power output of the microgrid system 10. Advantageously, various generators 14 can be taken offline on staggered or varying schedules to ensure each generator 14 is serviced at appropriate intervals. Further, by utilizing multiple and/or redundant generators 14, the generators 14 can be operated to maximize efficiency. As can be appreciated, different generators 14 may operate at peak efficiency at various operating conditions and loads. Therefore, for generators 14 that are more efficient at high loads, certain generators 14 can be taken offline to allow fewer generators 14 to operate at a peak efficiency output. In another example, for generators 14 that are more efficient at medium to low loads, all generators 14 can be online to operate in an efficient range.

Figure 3:
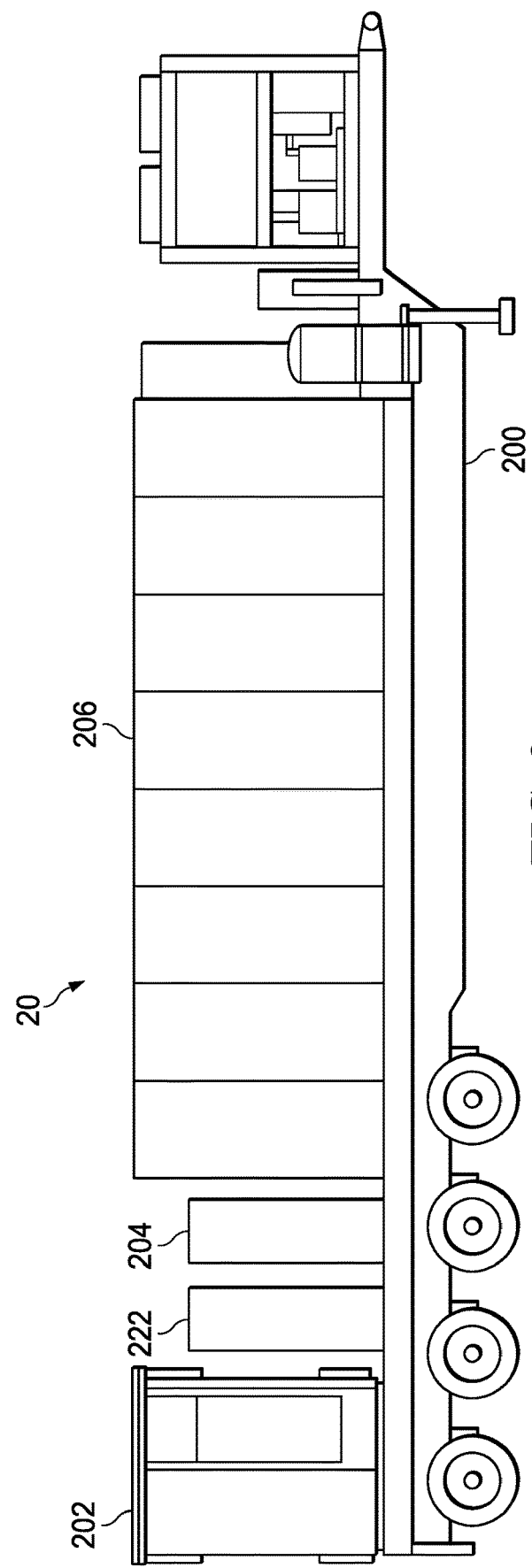
FIG. 3 is a schematic side view of the electrical storage system, in accordance with embodiments of the present disclosure.
Figure 4:
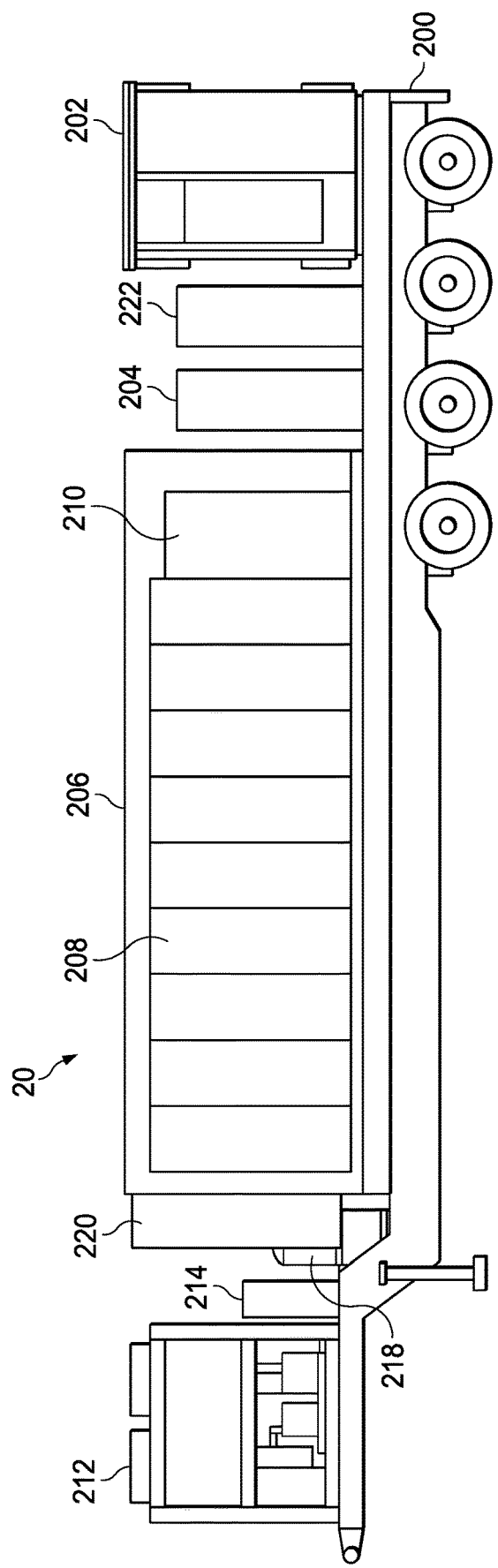
FIG. 4 is a schematic side view of the electrical storage system, in accordance with embodiments of the present disclosure.

FIG. 3 is a schematic side view of the electrical storage system 20, in accordance with embodiments of the present disclosure. FIG. 4 is a schematic side view of the electrical storage system 20, in accordance with embodiments of the present disclosure. With reference to FIGS. 1, 3, and 4, the microgrid system 10 can utilize one or more electrical storage system 20 to provide a primary, secondary, or supplemental source of power to the switchgear trailer 12. In some embodiments, one or more electrical storage systems 20 can be directly connected to a load.

Figure 5:
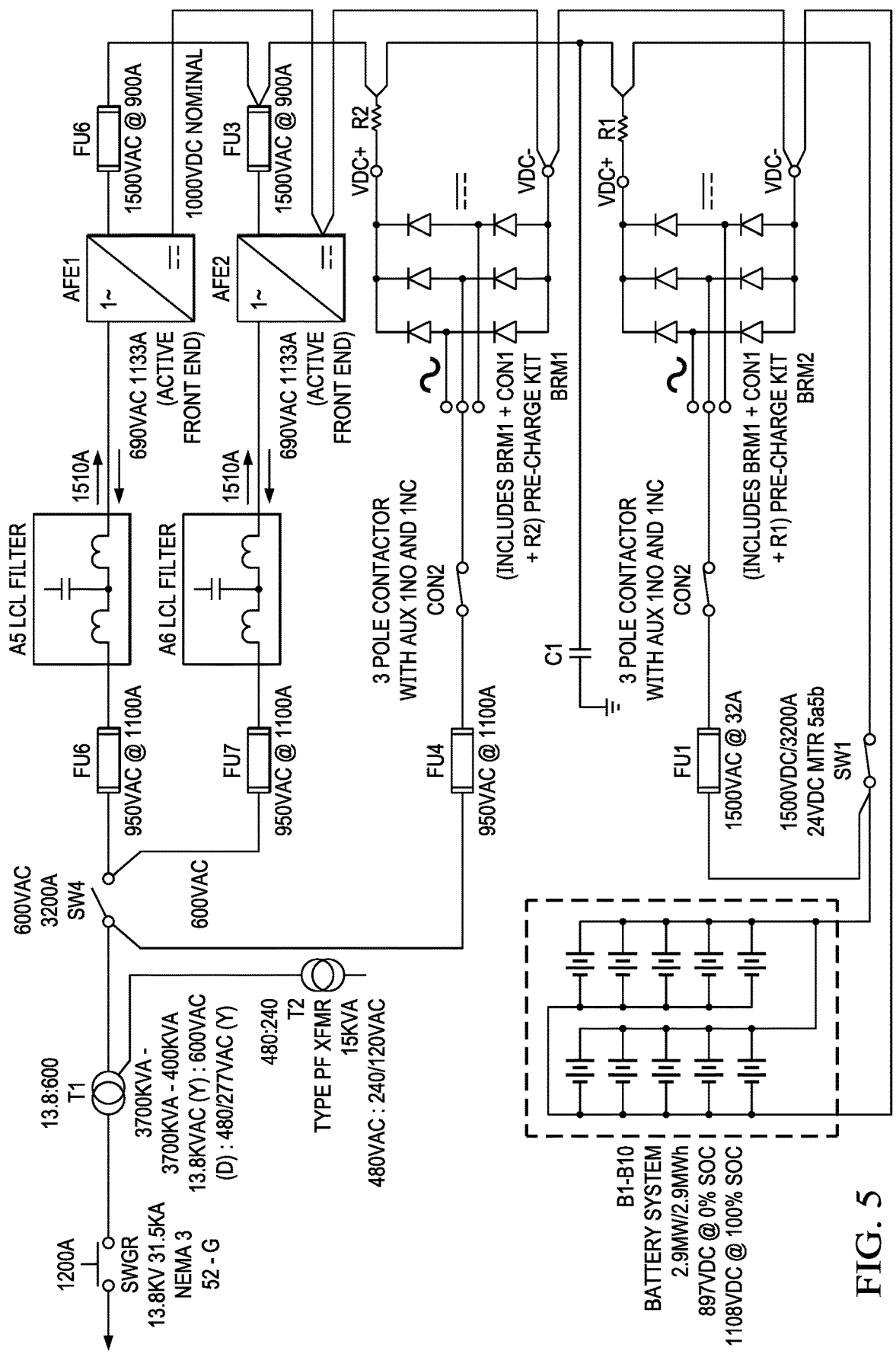
FIG. 5 is an electrical schematic of the electrical storage system, in accordance with embodiments of the present disclosure.

FIG. 5 is an electrical schematic of the electrical storage system 20, in accordance with embodiments of the present disclosure. With additional reference to FIG. 4, in the depicted example, the electrical storage system 20 includes one or more batteries 208 to receive, store, and provide energy to the switchgear trailer 12. Advantageously, by utilizing batteries 208 or other suitable power sources, the electrical storage system 20 can allow for power storage and transient response, reducing bus voltage sag or swell and disruptions in the quality of power output by the microgrid system 10. In the depicted example, the electrical storage system 20 can include ten batteries 208, while any other suitable number of batteries 208 can be included. Each battery 208 can include one or more modules. The batteries 208 may be designed as battery packs that allow for flexibility in packaging and may allow for the retrofitting to update equipment as needed. In some embodiments, the electrical storage system 20 includes one or more inverters 210 to convert the DC current of the batteries 208 to AC current. Further, the electrical storage system 20 can include a transformer 202 to adjust the voltage from the batteries 208 as needed. Optionally, electricity may circumvent the transformer 202 to provide greater variation in AC output voltage from the electrical storage system 20. Electricity may be routed through a switchgear 204 electrically connected to the transformer 202 and/or the batteries 208. The switchgear 204 can be modular or stackable. Power from the switchgear 204 can flow to the switchgear trailer 12 via a connector. The connector may be a TJB connector.

In some embodiments, the batteries 208 can be cooled for reliability and performance. Coolant can be circulated through cooling plates disposed between modules of the batteries 208 to transfer heat from the batteries 208. The coolant can pass through a chiller 212 to extract heat from the coolant, and in turn the batteries 208. The coolant can include a liquid glycol mixture, a water glycol mixture, or any other suitable coolant. Optionally, the cooling system can include a surge system 218 for the coolant. Optionally, the inverter 210 can also be cooled by an auxiliary chilling system 214. In some embodiments, batteries 208 and/or other components of the electrical storage system 20 can be cooled by refrigeration systems, solid state cooling systems, or other suitable cooling systems.

As illustrated, batteries 208 can be disposed within one or more enclosures 206. The enclosures 206 can be formed from steel. In some embodiments, the batteries 208 are fully enclosed in a specific duty, steel control house enclosure 206. Optionally, the enclosure 206 can include access panels to allow access to the batteries 208 within the enclosure 206.

Optionally, the enclosure 206 can be cooled or otherwise conditioned to further cool the batteries 208 and other components of the electrical storage system 20. In some embodiments, the electrical storage system 20 can include HVAC system 220 to maintain a desired environment within the enclosure 206. The HVAC system 220 can provide air cooling or air heat, as needed. Optionally, the HVAC system 220 can filter and prevent solid particles from entering the HVAC enclosure. In some applications, components of the electrical storage system 20 can be cooled using air cooling and/or liquid immersion techniques.

In some applications, the components of the electrical storage system 20 can be mounted to a mobile platform or trailer 200 to facilitate transport of the electrical storage system 20. In alternative applications, the electrical storage system 20 can be mounted to an alternative platform, such as a skid.

Advantageously, the power storage and transient response of the electrical storage system 20 allows the system to provide supplemental power to the microgrid system 10 during transient load phases. In some applications, when the common bus of the switchgear trailer 12 has a transient load phase, this can cause a voltage sag/swell and disruption in the quality of power outputted by the microgrid system 10. One or more electrical storage systems 20 can provide power to the common bus of the switchgear trailer 12 to supplement the common bus to reduce the voltage sag/swell and minimize the effects of the transient load phase. In a similar way, the electrical storage systems 20 can function as back up energy storage for the microgrid system 10. In some embodiments, the electrical storage systems 20 can be used in power distribution to support line voltage over long distances by connecting electrical storage system 20 units along the distribution line length.

In various embodiments, the electrical storage systems 20 are capable of varying the discharge profile from the electrical storage system 20 based upon the required load. By way of example, the electrical storage system 20 may be used to supplement the microgrid system 10 power during load peaking. The electrical storage system 20 is designed to provide main bus stability during peak load demands, and limit the need for additional generators 14 to be placed online during the intermittent peak loads, thereby reducing the amount of carbon fuel usage. In other embodiments, the electrical storage system 20 may be used to harvest power from the macrogrid when power prices are favorable. As described herein, one or more electrical storage systems 20 can be used to provide power to loads. Further, in some applications, one or more electrical storage systems 20 can be used in a hybrid arrangement with macrogrid or generator power to provide power to loads.

In some applications, energy from the electrical storage systems 20 can be utilized to maintain offline generators 14 in a ready state to allow to offline generators 14 to be brought online rapidly. Energy from the electrical storage systems 20 can be utilized to energize the coolant pump, oil pump, and/or oil heater of an offline generator 14, allowing the generator 14 to be readily brought online to dispatch power to the microgrid. Advantageously, by maintaining the offline generators 14 in a ready state, fuel consumption, operating cost, and overall emissions can be reduced as the offline generator 14 is brought online. As described above with respect to the generators 14, power from the electrical storage systems 20 can be backfed through the electrical output of the generator 14 to maintain the offline generators 14.

In certain embodiments, the electrical storage system 20 connects to a power supply that provides a charge to the electrical storage system 20 . The charging power supply could be a single or plurality of generators, utility supply, or a combination thereof.

In certain embodiments, the electrical storage systems 20 include an auxiliary power outlet such that the electrical storage systems 20 can be plugged in to the auxiliary power outlet to charge the electrical storage systems 20. In certain embodiments, the electrical storage systems 20 can provide auxiliary power and includes remote charging ports. In some embodiments, the electrical storage systems 20 have shore power connections for charging batteries and to maintain acceptable temperatures of the energy storage and power electronics. The rate of charge and discharge of the electrical storage systems 20 is varied by the control system 222. The control system 222 considers a variety of parameters including: ambient conditions, state of charge, charge/discharge cycle count, storage system lifespan, HVAC constraints, load requirement, and charge power available. The control system 222 is designed to operate "autonomously" meaning the control system 222 is independent from the generator controls and does not have an intrusive interface with the power generation operations. Advantageously, this increases the versatility of the electrical storage systems 20 because they can be used in a variety of applications without the hindrance of a complicated interface. In some embodiments, the control system 222 of the electrical storage systems 20 is designed to supplement the grid with power when certain parameters are met.

In certain embodiments, the electrical storage systems 20 are designed to operate autonomously from the main power generation system of the microgrid system 10. One electrical storage system 20 is designed to operate autonomously from other electrical storage systems 20 such that one unit can be charging while another is discharging energy. Each battery 208 includes its own control that is aggregated into the battery monitoring system which sits on each rack containing the battery 208. The battery monitoring system communicates with the batteries 208 to monitor several parameters including, but not limited to: temperature, DC voltage, state of health, state of charge, depth of discharge, and amplitude of DC current flow with direct of flow. The battery monitoring system can also turn off and on modules within the battery 208. The battery monitoring system for each battery 208 is networked into the control system 222, which controls and monitors all ancillary systems of the trailer 200. In certain embodiments, the control system 222 can be operated remotely.

In some embodiments, the electrical storage systems 20 can include a fire suppression system. For example, the electrical storage systems 20 can include a fire suppression system suitable for lithium batteries, including gas-based systems or water-based systems. The fire suppression system can include an automated internal flame sensor to automate the discharge of the fire suppression system and/or trigger audible or visual signals. In some embodiments, the fire suppression system can include internal motion sensors to determine if personnel are within proximity of the electrical storage systems 20. In some applications, the fire suppression system can include additional sensors, such as sensors to detect the presence of explosive gas. The fire suppression system can further include manually operated discharge controls near doorways of the electrical storage systems 20.

Figure 6:
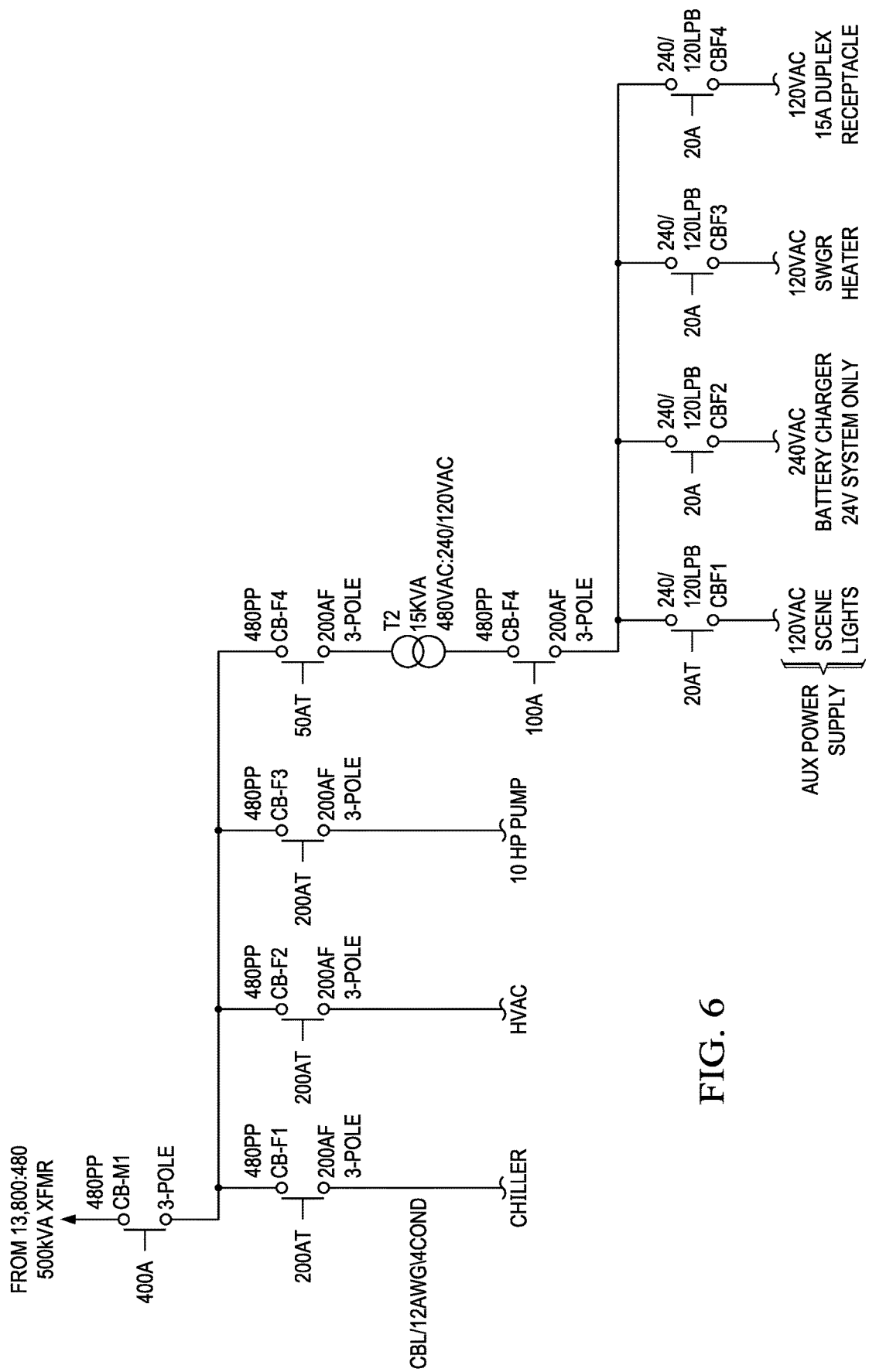
FIG. 6 is an electrical schematic of the auxiliary power supply of the electrical storage system, in accordance with embodiments of the present disclosure.

FIG. 6 is an electrical schematic of the auxiliary power supply of the electrical storage system 20, in accordance with embodiments of the present disclosure. In the depicted example, the auxiliary power supply provides power to the lights, chiller, and HVAC system.

Figure 7:
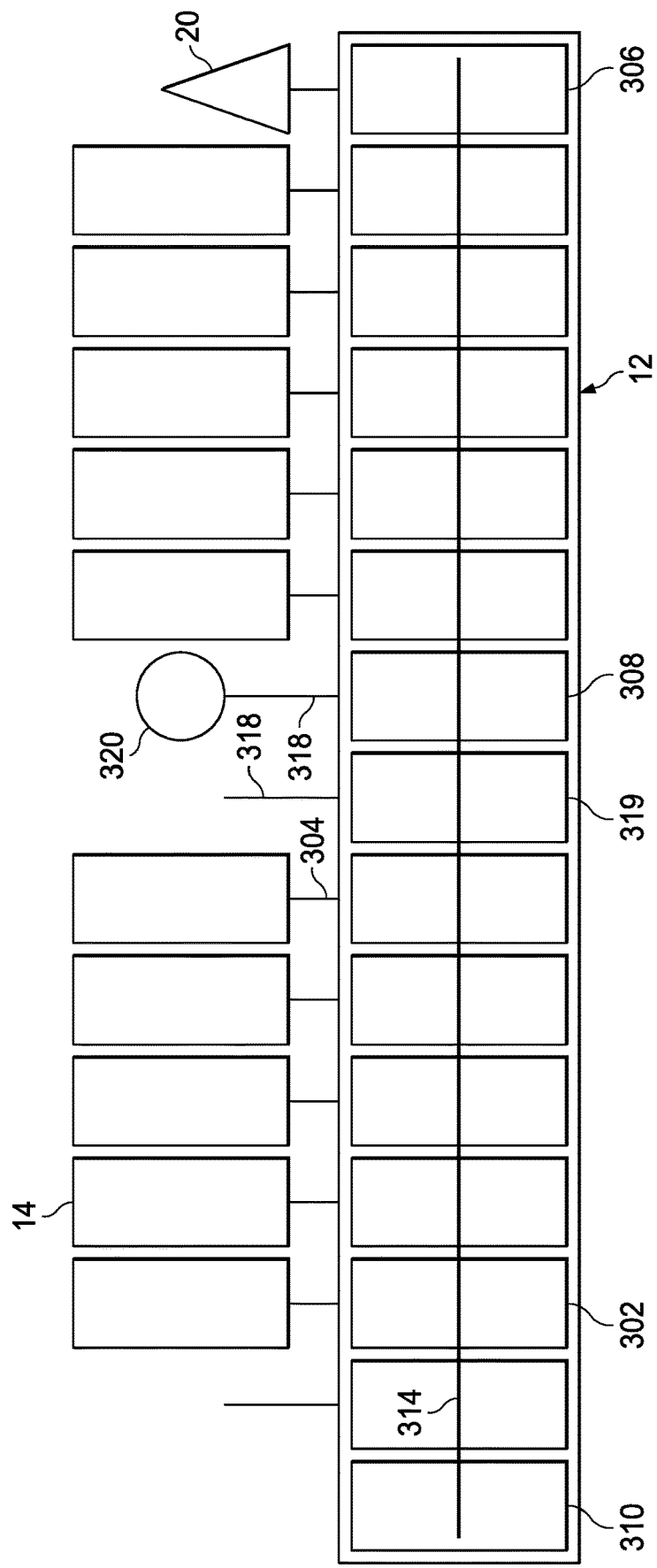
FIG. 7 is a cross-sectional view of a switchgear trailer, in accordance with embodiments of the present disclosure.

FIG. 7 is a cross-sectional view of a switchgear trailer 12, in accordance with embodiments of the present disclosure. As described herein, the switchgear trailer 12 receives power from the generators 14, the electrical storage systems 20, and/or macrogrid power via the utility section 16, combines the available power, and distributes the power to the loads 19 of the microgrid system 10. Advantageously, the switchgear trailer 12 can be readily transported to a desired location, including remote locations. In some embodiments, the switchgear trailer 12 can be mounted on a single mobile platform that may be mobilized and demobilized regularly.

In the depicted example, the switchgear trailer 12 receives power from various power sources (generators 14, electrical storage systems 20, and/or macrogrid power) via one or more power inputs 304. In some embodiments, the inputs 304 are coupled to or otherwise functionally associated with circuit breakers, such as generator breakers 302, electrical storage system breaker 306, and/or utility breaker 308. In some embodiments, each input 304 is associated with a circuit breaker, a wye/wye transformer, a connection to the bus bar 314, a relay, a pilot wire detection relay, and an interconnect receptable for cables. For example, each input 304 is associated with a 1200 amp circuit breaker, a wye/wye transformer, a connection to a bus bar certified for up to 2000 amps, a SEL 700G relay, a pilot wire detection relay, and a 15 kV interconnect receptacle. In some embodiments, the switchgear trailer 12 can include five or more inputs 304, or any other suitable number of inputs 304.

In the depicted example, a bus bar 314 can combine the power received by the switchgear trailer 12 via the inputs 304 for distribution to the loads 19. The bus bar 314 is a conductive element that conducts electricity from each of the inputs 304 to loads 19 via outputs 318. The bus bar 314 is electrically connected to each of the inputs 304 and the outputs 318. The bus bar 314 can be formed from a metallic strip or bar to allow for high current power distribution between the inputs 304 and the outputs 318.

In some applications, the bus bar 314 can have a maximum current handling capability or amperage. For example, the parameters of the bus bar 314, such as the size, shape, and materials of the bus bar 314 can affect the heat dissipation and current handling capabilities of the bus bar 314. Therefore, the bus bar 314 can be designed or selected for an intended or desired maximum amperage. In some applications, the bus bar 314 can limit the amount of power that can be distributed by the microgrid system 10.

In some applications, the bus bar 314 can be "oversized" or have a larger current capability than is required for a given microgrid system 10 application. For example, the bus bar 314 can be designed to have a current capability that meets or exceeds a total anticipated power requirements of the loads 19 of the microgrid system 10. Therefore, the bus bar 314 can have a current capability that exceeds the amount of power input into the bus bar 314 by the power sources, such as the generators 14 and/or the electrical storage systems 20. In some embodiments, the bus bar 314 can be rated at 2000 amps, or any other suitable amperage to provide the power distribution capabilities needed for the microgrid system 10.

Advantageously, the use of an "oversized" bus bar 314 allows for the microgrid system 10 to operate at a high power density. The increased power density allows for greater flexibility and configurability. For example, a microgrid system 10 that includes an "oversized" bus bar 314 may be able to operate and distribute power from all of the power sources connected to the switchgear trailer 12 or a selected number of power sources connected to the switchgear trailer 12.

In the illustrated embodiment, the switchgear trailer 12 includes one or more circuit breakers coupled to the bus bar 314 to protect the wiring and components of the microgrid system 10. The circuit breakers can interrupt the flow of electricity to or from the bus bar 314 if more current than intended passes through a circuit or if another fault occurs. The circuit breakers can be electrically connected to the inputs 304 and/or the outputs 318 of the switchgear trailer 12. In some applications, circuit breakers can be associated with certain power sources or loads. For example, generator breakers 302 can be electrically connected to generators 14, the electrical storage system breakers 306 can be electrically connected to the electrical storage systems 20, a utility breaker 308 can be connected to the macrogrid or utility power, and feeder breakers 319 can be electrically connected to loads 19 via the outputs 318. In the depicted example, the switchgear trailer 12 can include nine generator breakers 302, one electrical storage system breaker 306, one utility breaker 308, and two feeder breakers 319. As can be appreciated, the switchgear trailer 12 can include any suitable number of respective breakers 302, 306, 308, 319. The circuit breakers can be positioned to facilitate the attachment of connectors to each of the respective inputs 304 and outputs 318. In some embodiments, the respective inputs 304 and outputs 318 can utilize fast coupler connections.

In some embodiments, the connectors of the circuit breakers are uniform, allowing each of the circuit breakers to be interchangeably positioned within the switchgear trailer 12. As described herein, the circuit breakers can be positioned in a variety of configurations. For example, the circuit breakers can be arranged within the compartments of the switchgear trailer 12. In the illustrated embodiment, the switchgear trailer 12 includes fifteen parallel compartments to receive the circuit breakers. As illustrated, a plurality of generator breakers 302 are positioned within the switchgear trailer 12. Further, an electrical storage system breaker 306 can be positioned within the switchgear trailer 12. In some applications, the electrical storage system breaker 306 can be replaced with another breaker, such as a generator breaker 302. In some embodiments, the switchgear trailer 12 can include multiple electrical storage system breakers 306. As illustrated, a utility breaker 308 can be positioned in the switchgear trailer 12. Based on the configuration of the microgrid system 10, the utility breaker 308 can be replaced by another breaker, such as another generator breaker 302. Further, a feeder breaker 319 is positioned within the switchgear trailer 12. In some embodiments, the switchgear trailer 12 includes multiple feeder breakers 319.

In some applications, the circuit breakers can be arranged to reduce the footprint of the circuit breakers and other components within the switchgear trailer 12. The circuit breakers can be combined or stacked to reduce the footprint within the switchgear trailer. Advantageously, stacking the circuit breakers can reduce the footprint of the circuit breakers by up to 50% within the switchgear trailer 12.

In some embodiments, the circuit breakers of the switchgear trailer 12 are enclosed in individual compartments. In other embodiments, the circuit breakers of the switchgear trailer 12 are enclosed in a single enclosure. The enclosures may include heating and cooling ventilation systems to control environmental factors such as dust, moisture, internal temperatures, and ambient temperatures. In some applications, weatherproof designs are used to ensure successful and reliable operations in the varying environments.

In the depicted example, the switchgear trailer 12 distributes power from the power sources and bus bar 314 to one or more loads 19 via the outputs 318. The outputs 318 can include any suitable type of connector. Further, the output power can be distributed at 13.8 kV or any other suitable voltage for the load 19.

In some applications, the power demand of the load 19 can be higher than the amount of power that can be supplied by a single power source (e.g., the power required by the load 19 exceeds the power that a single generator 14 can produce). Therefore, in some embodiments, the power from multiple power sources (e.g., multiple generators 14, utility power, and/or one or more electrical storage systems 20) can be combined via the bus bar 314 and distributed to a desired load 19. As can be appreciated, the microgrid system 10 can be used with various load devices, including, but not limited to pumps used for fracturing operations, and other devices that have high power demands.

In some embodiments, power output by the switchgear trailer 12 can be metered to track consumption and/or to be sold to a customer of the microgrid system 10. Optionally, the switchgear trailer 12 includes a custody transfer meter 320 electrically connected to one or more of the outputs 318. The custody transfer meter 320 can measure and record the amount of power that is provided through a measured output 318 to a load 19. Advantageously, the custody transfer meter 320 allows for a microgrid operator to sell, transport, and account for power produced and/or sold by the microgrid system 10. Further, metering the power from the output 318 allows for common billing for one or more customers by the operators of the microgrid system 10. In some embodiments, the amount of fuel (e.g., natural gas) input into the microgrid system 10 can similarly be measured by another custody transfer meter. In some applications, the thermal efficiency of the microgrid system 10 can be determined based on the amount of fuel consumed by the microgrid system 10 and the amount of power output by the microgrid system 10. Further, emissions information regarding the microgrid system 10 can be determined using the same meters.

In some embodiments, the switchgear trailer 12 can be coupled to additional switch gear (e.g., sub-switchgear) to facilitate electrical connections with additional components. For example, the sub-switchgear can receive power from additional power sources such as generators 14, electrical storage systems 20, and/or macrogrid power, combine the available power, and distribute the power to the switchgear trailer 12. In some applications, the sub-switchgear can receive power from the switchgear trailer 12 and distribute the power to loads 19. The sub-switchgear can be electrically coupled to the switchgear trailer 12 via a circuit breaker.

Figure 8:
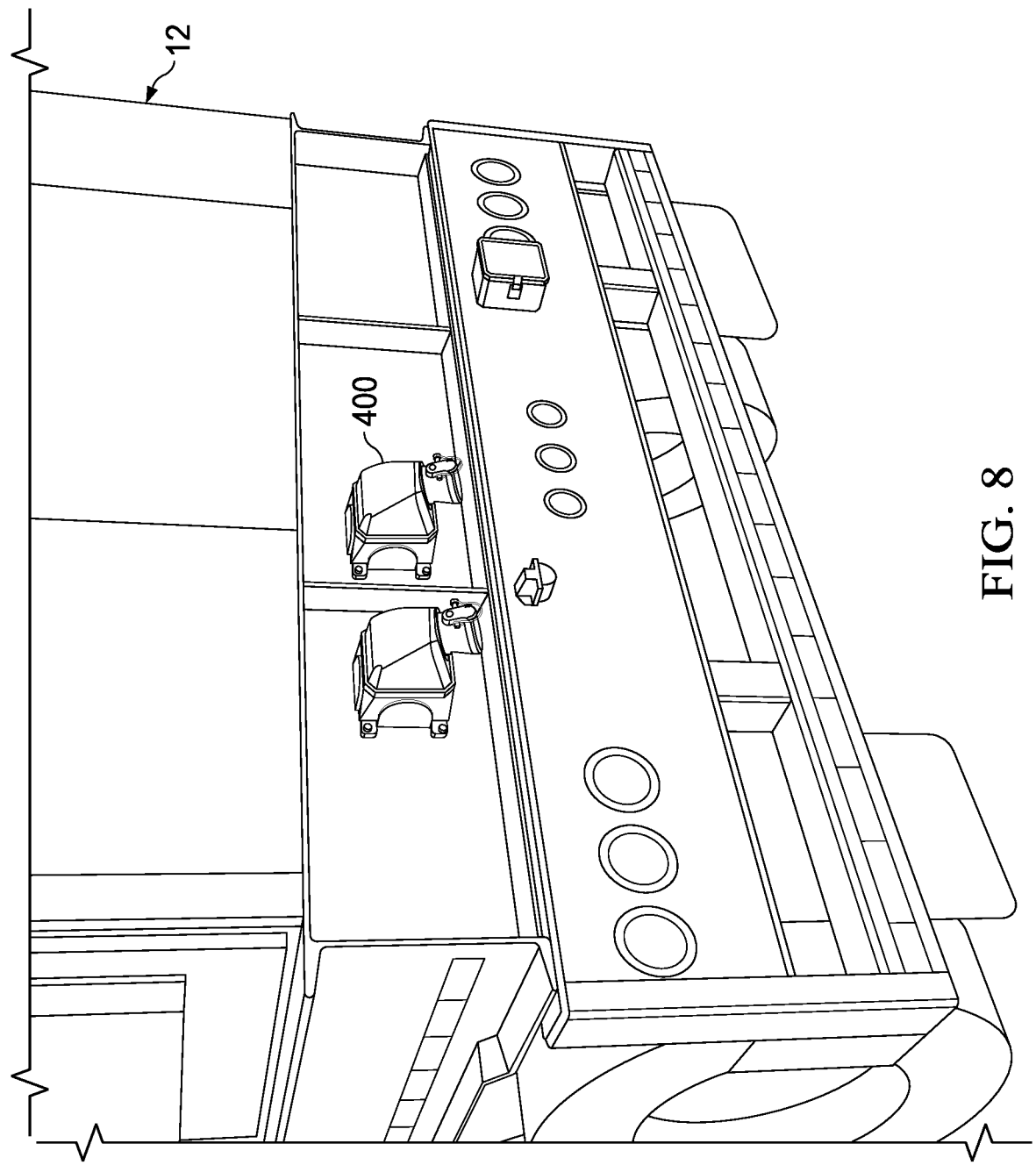
FIG. 8 is a schematic rear view of switchgear trailer, in accordance with embodiments of the present disclosure.

FIG. 8 is a schematic rear view of switchgear trailer 12, in accordance with embodiments of the present disclosure. With reference to FIGS. 7 and 8, the switchgear trailer 12 can optionally include an auxiliary unit 310 to power onboard functions and systems of the switchgear trailer 12. Further, the auxiliary unit 310 can allow the microgrid system 10 to recycle energy as needed. As shown in FIG. 7, the auxiliary unit 310 can be connected and powered by the bus bar 314.

As illustrated in FIG. 8, in some embodiments, the auxiliary unit 310 can include one or more auxiliary connectors 400. The auxiliary connectors 400 can be used with any suitable device. As illustrated, the auxiliary unit 310 can be disposed on an end of the switchgear trailer 12 to allow the auxiliary connectors 400 to be readily accessible to a user. The auxiliary unit 310, and therefore the auxiliary connectors 400, can be disposed on either end of the switchgear trailer 12. In some embodiments, the auxiliary connectors 400 can provide three-phase 208V power, or any other suitable voltage for auxiliary devices. Further, the auxiliary unit 310 can provide at least 4 MVA of power.

In the depicted example, the microgrid system 10 includes an integrated control system 450 that allows control of components of the microgrid system 10. In some embodiments, the integrated control system 450 can control operation of the generators 14 and the switchgear trailer 12. Optionally, the integrated control system 450 can control operation of other components, such as the electrical storage systems 20. Advantageously, the integrated control system 450 can control operation of the microgrid system 10 and allow for monitoring and reliability for the microgrid system 10.

Figure 9:
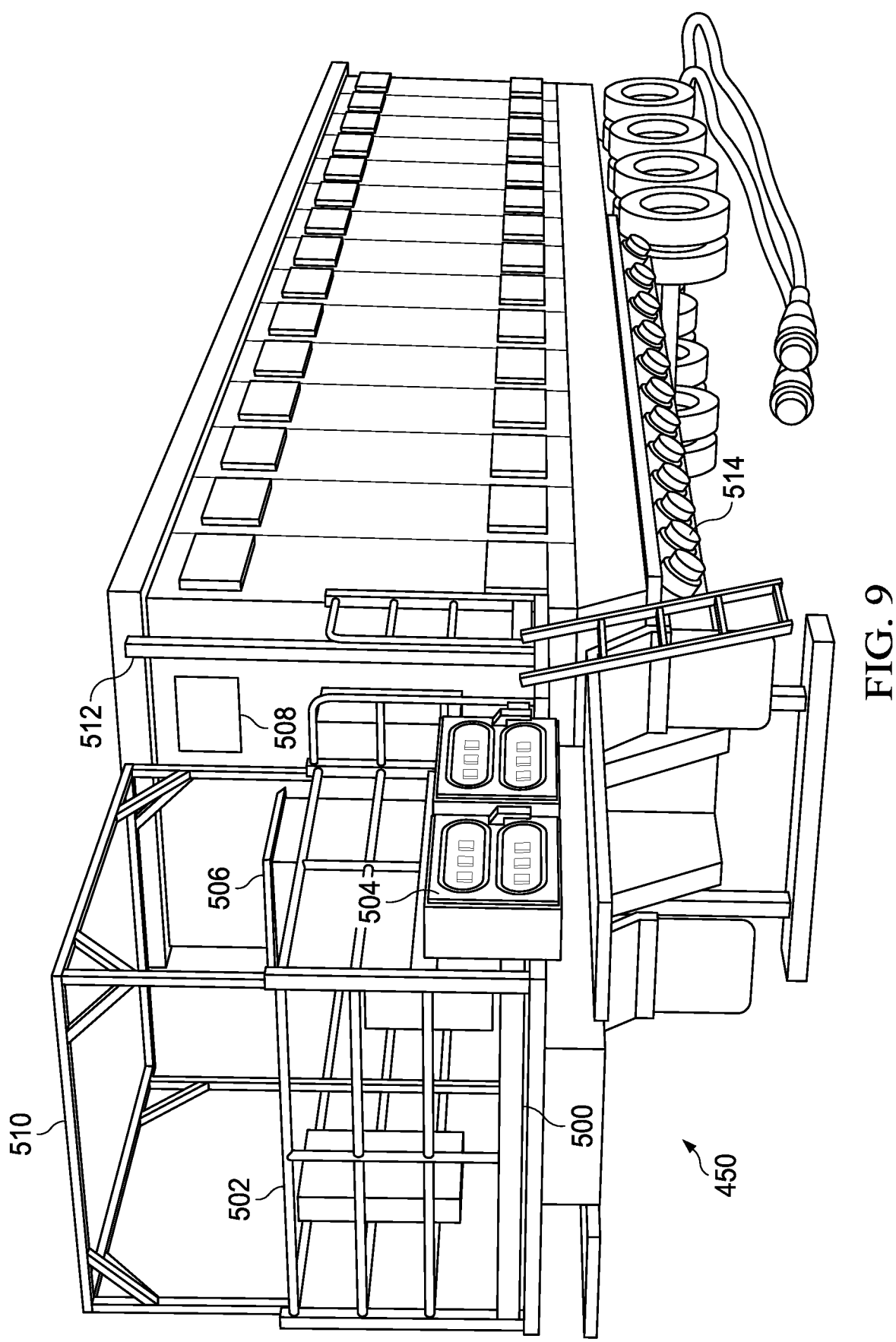
FIG. 9 is a schematic side view of a switchgear trailer, in accordance with embodiments of the present disclosure.

FIG. 9 is a schematic side view of a switchgear trailer 12, in accordance with embodiments of the present disclosure. With reference to FIG. 9, in some applications, some of the components of the integrated control system 450 are housed within the switchgear trailer 12. For example, components of the integrated control system 450 can be housed within the relay racks 504 and server rack 506. Components of the integrated control system 450 can include, but are not limited to communication cabling, an interlock system, and a control board. In some embodiments, the relay racks 504 and the server rack 506 are mounted on a common platform 500 disposed along a rear of the switchgear trailer 12. The common platform 500 can be encompassed by a railing 502. In some applications, components of the integrated control system 450 are disposed at a remote location (e.g., cloud based control).

In some embodiments, operations of the integrated control system 450 can be controlled remotely via satellite 510 and/or cellular antenna 512. Optionally, the integrated control system 450 can be operated from the common platform 500 via an ethernet cable connection. Further, the integrated control system 450 can be manually controlled via a manual control panel 508 that is also accessible from the common platform 500. In some applications, the integrated control system 450 can be configured to operate with default settings if an operator cannot communicate with the integrated control system.

In some embodiments, the integrated control system 450 can monitor operational parameters of the microgrid system 10. For example, the integrated control system 450, utilizing sensors well known to those of ordinary skill in the art, can monitor and/or log parameters regarding the engine performance, engine emissions, power generation, power distribution, job performance, reliability, electrical system, preventative maintenance, etc. Engine parameters can include, exhaust parameters, mass fuel consumption, engine oil temperature, engine coolant temperature, engine speed, gas quality, gas composition, detonation, etc. Power generation parameters can include voltage, frequency, current, battery state of charge, etc. Electrical system parameters can include circuit breaker life, breaker state, etc. Job parameters can include location data, arc flash detection, operating time, equipment downtime, etc.

In some embodiments, the integrated control system 450 can transmit data regarding the microgrid system 10 to remote locations via ethernet/LAN, Wi-Fi, LTE, and/or satellite communications. The collected data can be stored and transmitted in any suitable format. Optionally, information regarding the microgrid system 10 can be accessed through a customer portal. The customer portal can be cloud-based. The portal can provide real-time visualization of the transmitted data, calculated data, financial information, operational information, maintenance information, and/or emissions data. The data can be represented in numerical and/or graphical form. In some embodiments, the portal can provide real-time monitoring and control of individual pieces of equipment of the microgrid system 10.

The integrated control system 450 can present emissions data. The emissions data may be presented in the portal as raw data or calculated data, based on multiple calculation methods. The emissions data may be presented by geographic region, equipment fleet configuration, individual pieces of equipment, equipment type, and other various forms of aggregation.

Additionally, the portal can include performance information. Performance parameters can include power demand, operating time, fuel type and composition, various forms of energy and power generation, flow rate, pressure, idle time, power quality, load profile, environmental factors, cost, and ambient conditions. Advantageously, modeling within the portal can provide comparisons between specific operating parameters and equipment types. For example, modeling can be used to compare reciprocating power generation to turbine power generation to gain an understanding of the benefits and challenges associated with the respective equipment types.

Further, the portal can collect and store data relevant to operational and safety related forms related to overall jobsite operations and specific component testing. In some embodiments, the portal can be used to download key job parameters related to the specific job site or work order. In some embodiments, the portal can collect and store data from external and/or third-party sources.

Advantageously, the integrated control system 450 can apply machine learning methods to revenue models, cost models, operations and maintenance parameters, consumables, geographic information, environmental factors, customer parameters, energy demands and market pricing, health, safety and quality factors, and personnel.

Further, the integrated control system 450 can operate the microgrid system 10. In the depicted example, the integrated control system 450 allows the operator to manipulate power sources (such as generators 14) in real time. In some embodiments, the power sources can be manipulated in real time to optimize the microgrid system 10 for a variety of parameters, such as: changes in load, operation cost, revenue potential, and/or emissions Optionally, the integrated control system 450 can manipulate power sources to load balance the power sources, charge the electrical storage systems 20, discharge the electrical storage systems 20, dispatch a power source, provide power to a load 19, and/or adjust output of the power sources based on changes to the load 19. In some applications, the integrated control system 450 can activate or deactivate generators 14 based on desired response characteristics for the microgrid system 10. For example, an operator can increase the stiffness of the microgrid system 10 by activating additional generators 14 in addition to the minimum number of generators 14 necessary for the output requirement. Further, the integrated control system 450 can activate and deactivate generators 14 and/or electrical storage systems 20 based on changes to the load 19. Additionally, the integrated control system 450 can activate and deactivate generators 14 for maintenance and fire suppression operations.

In some embodiments, the integrated control system 450 and/or the microgrid system 10 can be remotely controlled with remote control commands. Optionally, the integrated control system 450 can utilize autonomous control and operation. In some applications, autonomous operation could be utilized when power generation equipment is connected to electrical utility or a microgrid. The integrated control system 450 can utilize the following factors for autonomous control: grid emissions profile, electrical power pricing, environmental and ambient conditions, various market factors indirectly or directly correlated to electrical power pricing, customer input, operator input, load balance between various energy sources, and other correlations that may be discovered or derived through a machine learning process.

Figure 10:
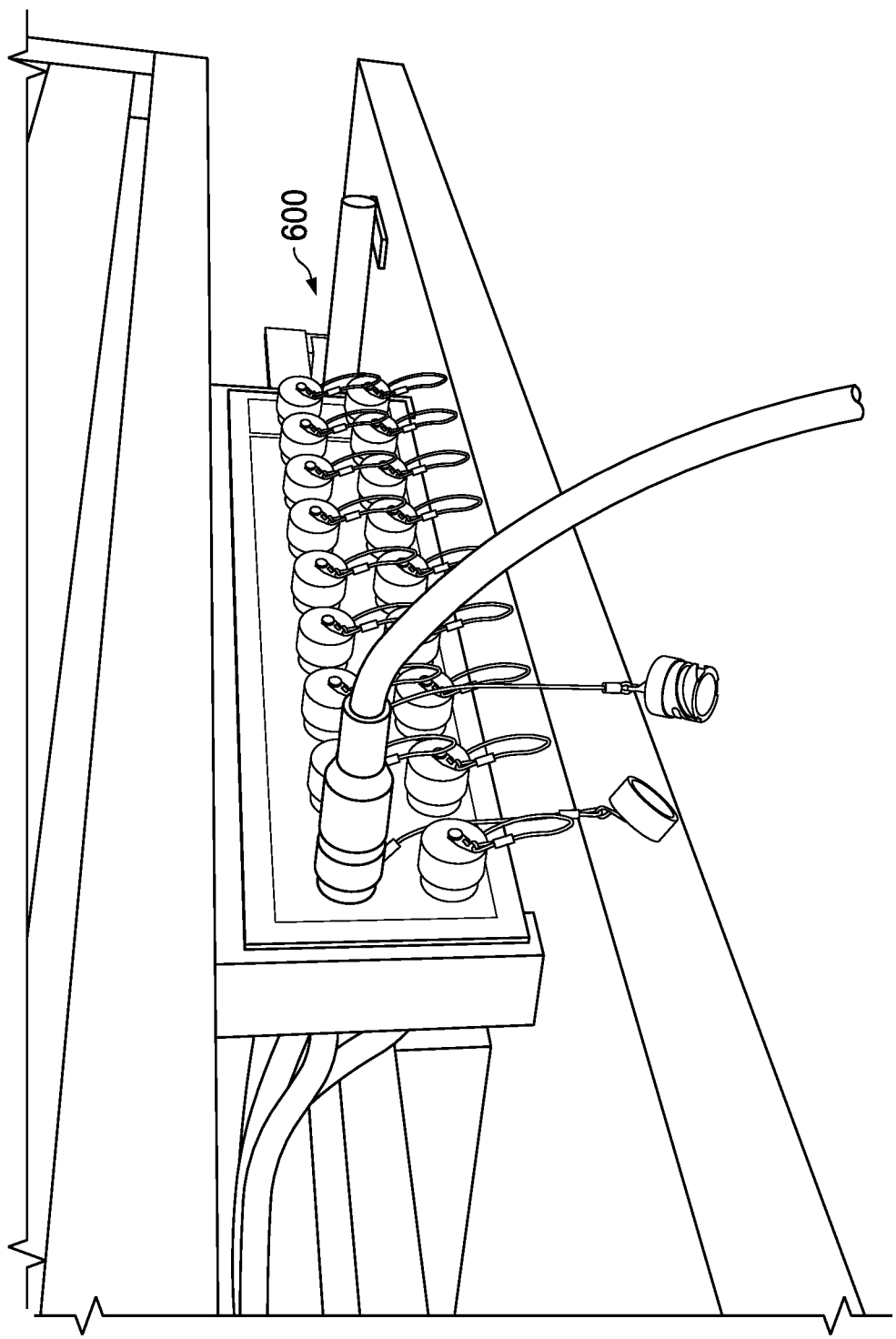
FIG. 10 is a schematic view of the integrated control system control board on the switchgear trailer, in accordance with embodiments of the present disclosure.
Figure 11:
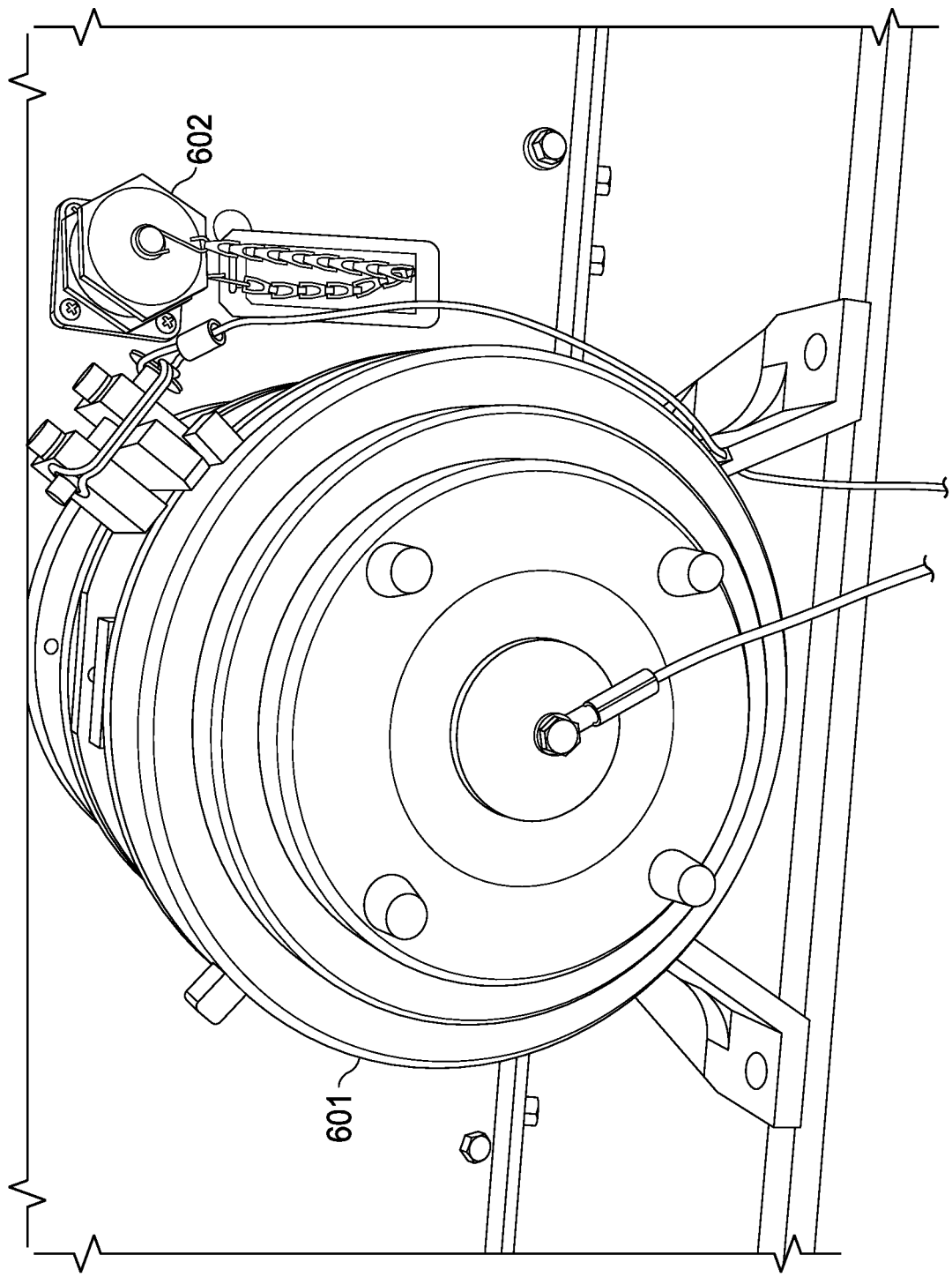
FIG. 11 is a schematic view of a connector on the switchgear trailer, in accordance with embodiments of the present disclosure.

FIG. 10 is a schematic view of the integrated control system control board 600 on the switchgear trailer 12, in accordance with embodiments of the present disclosure. FIG. 11 is a schematic view of a connector 601 on the switchgear trailer 12, in accordance with embodiments of the present disclosure. In some embodiments, the interlock system 602 and the integrated control system 450 controls the energization of the connector 601 to prevent the connector 601 from being energized when disconnected. In the depicted example, the interlock system 602 connects to two pins of the connector 601 to monitor the connection of the connector 601 to the switchgear trailer 12. In some embodiments, the connector 601 is a TJB connector. In some embodiments, the connector 601 is disposed on a control board 600.

During operation, the integrated control system 450 can control the energization of the connector 601 based on the state of the interlock system 602. In the depicted example, the integrated control system 450 can prevent or terminate the flow of electricity to the connector 601 if the interlock system 602 loses connection between the electrical cable and the switchgear trailer 12. Advantageously, the interlock system 602 and the integrated control system 450 prevent an uncoupled connector 601 from being energized.

Optionally, the integrated control system 450 can monitor the ground lines that attach to the connector 601 for continuity. In the event that ground continuity is jeopardized, the integrated control system 450 can remove power to the connector 601.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A mobile microgrid comprising:
a plurality of energy sources comprising mobile reciprocating natural gas generators, wherein at least one of the plurality of energy sources is a redundant energy source, the mobile microgrid has a maximum anticipated load, and a power output of a subset of the plurality of energy sources without the redundant energy source exceeds the maximum anticipated load; and
a switchgear trailer comprising:
at least one output;
a plurality of inputs, wherein the number of inputs is equal to or greater than the number of energy sources;
a plurality of circuit breakers, each circuit breaker configured to be electrically connected to one of the plurality of energy sources; and
a bus bar electrically connected to:
each of the plurality of inputs; and
the at least one output.

2. The mobile microgrid of claim 1, wherein the number of inputs is greater than the number of energy sources.

3. The mobile microgrid of claim 1, wherein the plurality of energy sources further comprises an electrical storage system configured to be electrically connected to respective inputs of the plurality of inputs on the switchgear trailer.

4. The mobile microgrid of claim 1, further comprising a controller configured to obtain one or more parameters of the plurality of energy sources and control operation of at least one of the plurality of energy sources or the switchgear trailer in response to the one or more parameters.

5. A mobile microgrid comprising:
a plurality of mobile reciprocating natural gas generators, wherein at least one of the plurality of mobile reciprocating natural gas generators is a redundant generator and a power output of the plurality of mobile reciprocating natural gas generators without the redundant generator exceeds a maximum anticipated load of the mobile microgrid; and
a switchgear trailer comprising:
at least one output;
a plurality of inputs, wherein the number of inputs is equal to or greater than the number of generators;
a plurality of circuit breakers, each circuit breaker configured to be electrically connected to one of the plurality of generators; and
a bus bar electrically connected each of the plurality of inputs and the at least one output.

6. The mobile microgrid of claim 5, wherein:
each of the plurality of inputs defines a maximum input amperage;
the at least one output defines a maximum output amperage;
the bus bar defines a maximum bus bar amperage; and
the maximum output amperage and maximum bus bar amperage are each greater than the combined maximum input amperage of the plurality of inputs.

7. The mobile microgrid of claim 5, wherein the plurality of inputs comprises five or more inputs.

8. The mobile microgrid of claim 5, wherein each of the plurality of reciprocating natural gas generators is configured to generate at least 2.5 MW of power.

9. The mobile microgrid of claim 5, wherein each of the plurality of inputs comprises a respective connector and all such connectors are substantially identical.

10. The mobile microgrid of claim 5, further comprising a first electrical storage system, comprising a battery and an inverter electrically connected to the battery and comprising an electrical storage system output, wherein the first electrical storage system is configured to be electrically connected to one of the plurality of inputs on the switchgear trailer.

11. The mobile microgrid of claim 10, wherein the number of inputs is at least two more than the number of generators.

12. The mobile microgrid of claim 10, further comprising a second electrical storage system configured to be electrically connected to another of the plurality of inputs on the switchgear trailer.

13. The mobile microgrid of claim 5, further comprising a controller configured to obtain one or more parameters of the plurality of generators and control operation of at least one of the plurality of generators or the switchgear trailer in response to the one or more parameters.

14. The mobile microgrid of claim 13, wherein the one or more parameters comprise a fuel flow rate, a fuel pressure, an operating temperature, a voltage, a frequency, or a current.

15. The mobile microgrid of claim 13, wherein the controller is configured to balance a load between the plurality of generators in response to the one or more parameters.

16. The mobile microgrid of claim 13, wherein the controller is disposed at a remote location.

17. The mobile microgrid of claim 13, wherein the controller is configured to transmit the one or more parameters to a remote location in real time.

18. The mobile microgrid of claim 5, further comprising at least one custody transfer meter electrically connected to the at least one output, wherein the at least one custody transfer meter measures an output power.

19. A method of providing electric power comprising the following steps:
providing a mobile microgrid having a maximum anticipated load, the mobile microgrid comprising:
a plurality of mobile reciprocating natural gas generators, wherein at least one of the plurality of mobile reciprocating natural gas generators is a redundant generator, a power output of the plurality of mobile reciprocating natural gas generators without the redundant generator exceeds the maximum anticipated load of the mobile microgrid; and
a switchgear trailer comprising:
at least one output;
a plurality of inputs, wherein the number of inputs is equal to or greater than the number of generators;
a plurality of circuit breakers, each circuit breaker configured to be electrically connected to one of the plurality of generators; and
a bus bar electrically connected each of the plurality of inputs and the at least one output;
electrically connecting each of the plurality of natural gas generators to one of the plurality of inputs on the switchgear trailer; and
operating the plurality of reciprocating natural gas generators such that electric power is transferred through the bus bar and the at least one output.

20. The method of claim 19, further comprising the step of electrically connecting at least one of the plurality of inputs on the switchgear trailer to a macrogrid power source.

21. The method of claim 19, further comprising the steps of:
- providing an electrical storage system comprising a battery and an inverter electrically connected to the battery and comprising an electrical storage system output; and
- electrically connecting the electrical storage system to one of the plurality of inputs on the switchgear trailer.

22. The method of claim 19, further comprising the steps of:
- providing power to a load using the mobile microgrid, wherein the load has a power demand less than or equal to the maximum anticipated load of the mobile microgrid.

23. The method of claim 22, further comprising the steps of:
- deactivating at least one mobile reciprocating natural gas generator of the mobile microgrid while providing power to the load.

* * * * *